United States Patent [19]

Schäfer

[11] Patent Number: 4,517,858
[45] Date of Patent: May 21, 1985

[54] DRIVE FOR SINGLE-WORM EXTRUDER

[75] Inventor: Heinrich Schäfer, Rosdorf, Fed. Rep. of Germany

[73] Assignee: Battenfeld Extrusionstechnik GmbH, Bad Oeynhausen, Fed. Rep. of Germany

[21] Appl. No.: 557,666

[22] Filed: Dec. 2, 1983

[30] Foreign Application Priority Data

Dec. 6, 1982 [DE] Fed. Rep. of Germany ....... 3244991

[51] Int. Cl.³ .............................................. F16H 1/28
[52] U.S. Cl. ....................................... 74/801; 74/640; 74/750 R; 74/785; 277/12
[58] Field of Search ................ 74/785, 786, 787, 788, 74/801, 797, 606 R, 750 R, 640; 198/672, 674, 675; 425/376 R; 277/12, 32, 205

[56] References Cited

U.S. PATENT DOCUMENTS

| 2,484,273 | 10/1949 | Desmoulins | 74/785 |
| 2,883,880 | 4/1959 | Merkle | 74/606 |
| 3,115,791 | 12/1963 | Dean | 74/750 R |
| 3,872,742 | 3/1975 | States | 74/785 |
| 4,078,454 | 3/1978 | Murakami et al. | 74/640 X |
| 4,359,914 | 11/1982 | Meisel, Jr. | 74/801 X |
| 4,384,498 | 5/1983 | Eichinger | 74/797 |
| 4,468,985 | 9/1984 | Nilsson | 74/801 |

FOREIGN PATENT DOCUMENTS

| 2316932 | 10/1974 | Fed. Rep. of Germany | 74/785 |
| 52-50459 | 4/1977 | Japan | 74/785 |

Primary Examiner—Lawrence J. Staab
Assistant Examiner—Dwight G. Diehl
Attorney, Agent, or Firm—Karl F. Ross; Herbert Dubno

[57] ABSTRACT

A drive for an extruder worm centered on an axis has a substantially closed housing axially juxtaposed with the worm, an input shaft extending along and rotatable in the housing about the axis, exposed axially at an input side of the housing, and adapted to be coupled to a drive motor, and an output shaft rotatable in the housing about the axis, exposed at an input side of the housing, and adapted to be coupled directly to the worm. An axial-thrust bearing is braced between the output shaft and the housing. A planetary transmission centered on the axis between the input and output shafts in the housing has a sun gear rotationally coupled to the input shaft, a ring gear spaced radially outward from the sun gear, a plurality of planet gears meshing with the sun and ring gears, and a planet carrier carrying the planet gears and rotationally fixed to the output shaft. The shafts, sun gear, and carrier are formed at the axis with coaxial axially throughgoing passages. A tube having an output end fixed at the passage of the planet carrier extends along the axis with radial play through the passage of the sun gear and at least partially through the passage of the input shaft and has an input end in the input shaft. A bearing supports the input end of the tube in the input-shaft passage and a seal is provided between the input end of the tube and the input-shaft passage.

10 Claims, 2 Drawing Figures

DRIVE FOR SINGLE-WORM EXTRUDER

FIELD OF THE INVENTION

The present invention relates to a planetary-gear drive. More particularly this invention concerns such a drive that is used to rotate the worm of an extruder.

BACKGROUND OF THE INVENTION

A drive for an extruder worm centered on an axis normally has a substantially closed housing axially juxtaposed with the worm, an input shaft extending along and rotatable in the housing about the axis and adapted to be coupled to a drive motor, an output shaft rotatable in the housing about the axis and adapted to be coupled directly to the worm, and an axial-thrust bearing engaged between the output shaft and the housing. A planetary transmission centered on the axis between the input and output shafts has a sun gear rotationally coupled to the input shaft, a ring gear spaced radially outward from the sun gear, a plurality of planet gears meshing with the sun and ring gears, and a planet carrier carrying the planet gears and rotationally coupled to the output shaft.

The extruder worm is provided internally with a heater or cooling unit whose feed lines extend axially out through the drive, so that the various parts form an axially throughgoing passage. Seals must be provided to segregate this passage from the housing interior, which is itself filled with oil to keep the various gears lubricated.

In such an arrangement (See "TPM Einschnecken-Extruder-Baureihe" of Thyssen Plastik Maschinen GmbH, Munich, 518 TPM 3D5.78 JWG 81324) the drive is of the single-stage type with the sun gear fixed on the drive shaft and the ring gear fixed in the housing. The planet carrier is supported solely by the planet gears, which are angularly equispaced about the axis between the sun and ring gears so that the carrier is effectively centered on the axis also. This planet carrier has an external toothing which engages in an internal toothed ring having an external toothing meshing with yet another internal toothing formed on a ring fixed on the output shaft.

The passage through the drive therefore axially traversing the input shaft, the output shaft, the axial thrust bearing, and the sun gear must be formed with respective sections of the passage. There must also, as mentioned above, be a seal between the output shaft and the sun gear, which seal is therefore located at the heart of the drive. Since the sun gear and output shaft rotate relative to each other, this seal is subjected to substantial wear and must be replaced periodically.

Such replacement is a fairly onerous job, as it entails substantial disassembly of the drive. To avoid taking apart the planetary transmission, the drive is normally unbolted from the extruder and its output end is removed along with the output shaft to gain access to this seal. This substantial disassembly can only be done once the heater and/or worm ejector is also taken off.

OBJECTS OF THE INVENTION

It is therefore an object of the present invention to provide an improved drive for a single-worm extruder.

Another object is the provision of such a drive for a single-worm extruder which overcomes the above-given disadvantages, that is which makes it relatively easy to replace the passage seal, and which otherwise is of simple and straightforward construction.

SUMMARY OF THE INVENTION

A drive for an extruder worm centered on an axis according to the invention has a substantially closed housing axially juxtaposed with the worm, an input shaft extending along and rotatable in the housing about the axis, exposed axially at an input side of the housing, and adapted to be coupled to a drive motor, and an output shaft rotatable in the housing about the axis, exposed at an input side of the housing, and adapted to be coupled directly to the worm. The input shaft can include a bearing element engaging the axial-thrust bearing. An axial-thrust bearing is braced between the output shaft and the housing. A planetary transmission centered on the axis between the input and output shafts in the housing has a sun gear rotationally coupled to the input shaft, a ring gear spaced radially outward from the sun gear, a plurality of planet gears meshing with the sun and ring gears, and a planet carrier carrying the planet gears and rotationally fixed to the output shaft. The shafts, sun gear, and carrier are formed at the axis with coaxial axially throughgoing passages. A tube having an output end fixed at the passage of the planet carrier extends along the axis with radial play through the passage of the sun gear and at least partially through the passage of the input shaft and has an input end in the input shaft. A bearing supports the input end of the tube in the input-shaft passage and a seal is provided between the input end of the tube and the input-shaft passage.

Thus the only seal in the system, in addition of course to the readily accessible seals between the input and output shafts and the housing, is the seal at the input end of the tube, which itself is also readily accessible. Such construction makes it possible to service all of the most wear-prone parts of the drive easily from outside it, without having to dismantle it appreciably or even disconnect it from the extruder.

The input end of the tube according to the invention is fitted tightly into the planet-carrier passage. An adhesive or weld may be used at this location to ensure a leakproof fit. The inner diameter of the tube and of the planet-carrier passage are substantially identical except where the tube is engaged in the planet-carrier passage. Thus a smooth bore or passage is formed through the drive for easy passage of the ejector rod and/or heating and cooling supply lines.

In accordance with this invention the sun gear is formed with external teeth and the input shaft is formed with internal teeth meshing therewith. The sun gear is wholly radially supported on the planet gears and on the teeth of the input shaft and is limited axially movable relative thereto. This self-centering style of mounting eliminates the need for special bearings, again greatly reducing the number of wear-prone parts in the drive. In addition, the planet carrier and input shaft according to the invention are relatively axially fixed in the housing and are formed with axially confronting faces that axially flank and are engageable with the axial ends of the sun gear. The sun gear and planet gears mesh immediately adjacent the axial face of the planet carrier.

The planet carrier of the system of this invention is provided with two axially spaced bearings supporting it in the housing and flanking the planet gears. In addition the ring gear and housing are formed with meshing and radially oppositely directed teeth and the ring gear is limitedly axially displaceable in the housing. This mounting makes the ring gear self-centering. Thus the central axis is determined by the relatively widely axially spaced bearings supporting the planet carrier, ensuring that there will be no contact between the relatively rotating tube and sun gear.

The system according to this invention can also have a second planetary transmission rotationally coupling the sun gear of the first-mentioned planetary transmission to the input shaft and including a second planet carrier rotationally fixed to the sun gear of the first-mentioned transmission and formed with a passage axially traversed by the tube, a second plurality of planet gears carried on the second carrier, a second ring gear meshing internally with the second planet gears and rotationally fixed in the housing, and a second sun gear externally meshing with the second planet gears, formed with a passage axially traversed by the tube, and rotationally fixed to the input shaft. In this manner a considerable mechanical advantage can be obtained.

DESCRIPTION OF THE DRAWING

The above and other features and advantages will become more readily apparent from the following, reference being made to the accompanying drawing in which.

SPECIFIC DESCRIPTION

Figure 1:
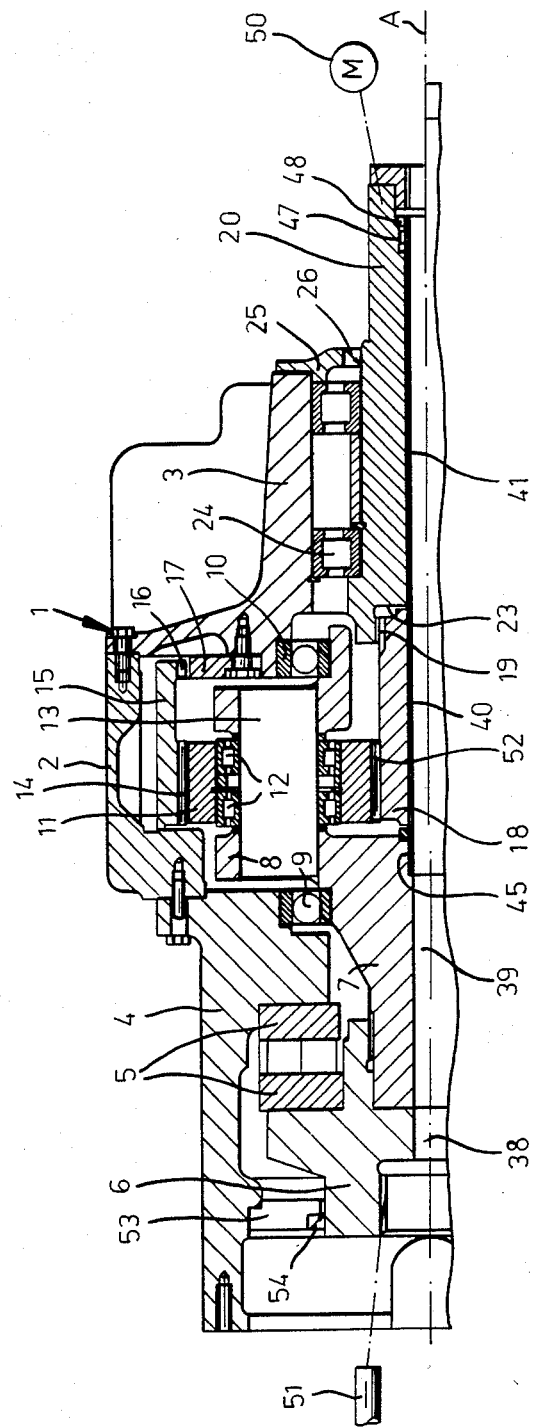
FIG. 1 is an axial section through a single-stage extruder drive according to the invention.

As seen in FIG. 1 an extruder drive has a housing 1 extending along an axis A and having a center part 2 to which an input part 3 and an output part 4 are bolted. An extruder worm 51 rotatable about the axis A is fixed to a drive element 6 supported via a heavy-duty axial-thrust bearing 5 on the housing part 4 and is splined to an output shaft 7 formed unitarily with a planet carrier 8 in turn supported in the part 4 for rotation about the axis A by a roller bearing 9. The element 6 and shaft 7 are formed with identical small-diameter bores 38 and 39 centered on the axis A, the bore 39 being stepped slightly outward at 45 on its input side.

The carrier 8 supports a plurality of angularly equi-spaced pins 13 carrying respective planet gears 11 via roller bearings 12. A ring gear 15 is formed with an output-side internal toothing 14 with which the gears 11 mesh and with an input-side toothing 16 meshing with an externally toothed ring 17 fixed on the housing part 3. Thus this ring gear 15 is mainly supported on the gears 11 and is limitedly axially displaceable in the housing 1.

Internally the gears 11 mesh with an output-side external toothing 52 of a sun gear 18 splined at its input side at 19 with an input shaft 20 supported by two axially spaced roller bearings 24 in the housing part 3. The planet carrier 8 forms an axial abutment or face 22 engageable with the confronting end of the sun gear 18 and the input shaft 20 has a similar abutment face 23 that is engageable with the input end of the gear 18. Thus this gear 18 is wholly supported at its output end on the gears 11 and is limitedly axially shiftable in the housing 1. This sun gear 18 is formed with an axially centered passage or bore 40 of somewhat greater diameter than the large-diameter stepped portion 45 of the bore 39 and coaxial therewith.

Similarly the input shaft 20 is formed in axial line therewith with an identical such passage or bore 41. The housing part 3 has an end cap 25 provided with a seal 26 that engages the shaft 20 and seals this end of the housing 1. Similarly a ring 53 and seal 54 close the opposite end of the housing 1, so that its interior is effectively closed and can be filled with a lubricant.

A tube 46 extends with play through the passages 41, and 40 and is tightly fitted and even held in place by means of an adhesive at its input end in the large-diameter portion 45 of the bore 39. The interior of this tube 46 is of the same size as the passages 38 and 39 to form a smooth continuation thereof. The input end of this tube 46 is supported by a journal or bearing 47 at the input end of the input-shaft passage 41 and a seal 48 is provided to prevent leakage therebetween. A cap 49 fits over the input end of this shaft 20. Thus there is an axially extending and centered cylindrical passage formed through the entire drive at the axis A. An ejector rod and/or a heating or cooling supply normally extends through this passage to the worm 51.

When the seal 48 in this arrangement wears, it can be replaced fairly easily by taking off the cap 49 and pulling it out, as easily as one replaces the seals 26 and 54. Thus these parts, which wear at a rate many times greater than any other parts of the drive according to the invention, can be replaced easily.

Figure 2:
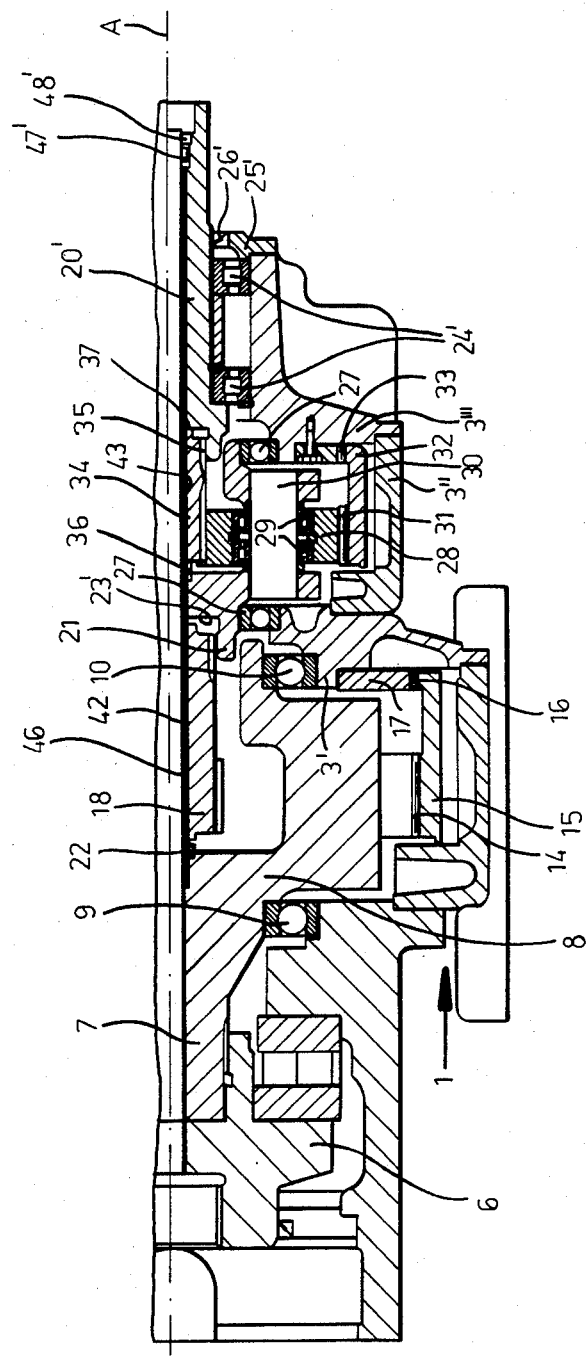
FIG. 2 is an axial section through a two-stage extruder drive according to the invention.

The arrangement of FIG. 2 is similar to that of FIG. 1, with the same references being used for identical structure. Here the sun gear 18 is not directly rotationally fixed to the shaft 20, but is indirectly rotationally coupled thereto via a second planetary-transmission stage, and the housing 1 has three input-side parts 3', 3", and 3'". This second planetary stage has a planet carrier 21 forming an abutment face 23', splined to the gear 18, and formed with a central bore 42 aligned with and identical to the bore 40. Bearings 27 support this carrier 21 on the housing parts 3" and 3'". Journal pins 30 support planet gears 28 via bearings 20 on this carrier 21 and a ring gear 32 meshes at 31 with them and at 33 with a ring gear 32 fixed on the housing part 3'". A sun gear 34 is axially flanked by abutment faces 36 and 37 of the carrier 21 and the input shaft 20', and has a bore 43 like the bores 42 and 44 of the carrier 21 and the input shaft 20'. This shaft 20' has a bearing 47' and seal 48', is supported in the housing part 3'" by bearings 24', and is otherwise constructed like the shaft 20.

This system offers a considerable stepdown between the motor 50 connected to the shaft 20' and the worm 51 connected to the element 6. The self-centering ring gear 32 and sun gear 34, like the gears 15 and 18, can be expected to have a long service life.

I claim:

1. A drive for an extruder worm centered on an axis, the drive comprising:
   a substantially closed housing axially juxtaposed with the worm;
   an input shaft extending along and rotatable in the housing about the axis, exposed axially at an input side of the housing, and adapted to be coupled to a drive motor;
   an output shaft rotatable in the housing about the axis, exposed at an input side of the housing, and adapted to be coupled directly to the worm;
   an axial-thrust bearing braced between the output shaft and the housing;

a planetary transmission centered on the axis between the input and output shafts in the housing and including:
   a sun gear rotationally coupled to the input shaft,
   a ring gear spaced radially outward from the sun gear,
   a plurality of planet gears meshing with the sun and ring gears, and
   a planet carrier carrying the planet gears and rotationally fixed to the output shaft, the shafts, sun gear, and carrier being formed at the axis with coaxial axially throughgoing passages;
a tube having an output end fixed at the passage of the planet carrier and extending along the axis with radial play through the passage of the sun gear and at least partially through the passage of the input shaft and having an input end in the input shaft;
a bearing supporting the input end of the tube in the input-shaft passage; and
a seal between the input end of the tube and the input-shaft passage.

2. The extruder drive defined in claim 1 wherein the output end of the tube is fitted tightly into the planet-carrier passage.

3. The extruder drive defined in claim 2 wherein the inner diameter of the tube and of the planet-carrier passage are substantially identical except where the tube is engaged in the planet-carrier passage.

4. The extruder drive defined in claim 1 wherein the sun gear is formed with external teeth and the input shaft is formed with internal teeth meshing therewith, the sun gear being wholly radially supported on the planet gears and on the teeth of the input shaft and being limited axially movable relative thereto.

5. The extruder device defined in claim 4 wherein the planet carrier and input shaft are relatively axially fixed in the housing and are formed with axially confronting faces that axially flank and are engageable with the axial ends of the sun gear.

6. The extruder drive defined in claim 5 wherein the sun gear and plane gears mesh immediately adjacent the axial face of the planet carrier.

7. The extruder drive defined in claim 1 wherein the planet carrier is provided with two axially spaced bearings supporting it in the housing and flanking the planet gears.

8. The extruder drive defined in claim 7 wherein the ring gear and housing are formed with meshing and radially oppositely directed teeth and the ring gear is limitedly axially displaceable in the housing.

9. The extruder drive defined in claim 1 wherein the output shaft includes a bearing element engaging the axial-thrust bearing.

10. The extruder drive defined in claim 1, further comprising a second planetary transmission rotationally coupling the sun gear of the first-mentioned planetary transmission to the input shaft and including:
   a second planet carrier rotationally fixed to the sun gear of the first-mentioned transmission and formed with a passage axially traversed by the tube;
   a second plurality of planet gears carried on the second carrier;
   a second ring gear meshing internally with the second planet gears and rotationally fixed in the housing; and
   a second sun gear externally meshing with the second planet gears, formed with a passage axially traversed by the tube, and rotationally fixed to the input shaft.

* * * * *